(12) United States Patent
Bennett et al.

(10) Patent No.: US 7,068,290 B2
(45) Date of Patent: Jun. 27, 2006

(54) AUTHORING SYSTEM

(75) Inventors: Stephen James Bennett, Darlinghurst (AU); Richard James Cartwright, Leichhardt (AU); Nigel Lloyd William Helyer, Newtown (AU); Roger David Butler, Bondi (AU)

(73) Assignee: Lake Technology Limited, Surry Hills (AU)

( * ) Notice: Subject to any disclaimer, the term of this patent is extended or adjusted under 35 U.S.C. 154(b) by 0 days.

(21) Appl. No.: 10/381,997

(22) PCT Filed: Oct. 9, 2001

(86) PCT No.: PCT/AU01/01267

§ 371 (c)(1),
(2), (4) Date: Sep. 23, 2003

(87) PCT Pub. No.: WO02/31710

PCT Pub. Date: Apr. 18, 2002

(65) Prior Publication Data

US 2004/0051718 A1    Mar. 18, 2004

(30) Foreign Application Priority Data

Oct. 9, 2000   (AU)   ..................... PR0618

(51) Int. Cl.
*G09G 5/00* (2006.01)
*G06F 3/00* (2006.01)
*G06F 9/00* (2006.01)
*G06F 17/00* (2006.01)

(52) U.S. Cl. ...................... 345/633; 715/864; 345/169; 345/173; 701/213

(58) Field of Classification Search ........ 345/419–427, 345/7–8, 702, 633, 169, 173; 715/864; 701/213
See application file for complete search history.

(56) References Cited

U.S. PATENT DOCUMENTS

| 5,086,385 A | * | 2/1992 | Launey et al. ................ 700/83 |
| 5,470,233 A |   | 11/1995 | Fruchterman et al. ...... 434/112 |
| 5,771,041 A | * | 6/1998 | Small ......................... 715/727 |
| 5,793,361 A | * | 8/1998 | Kahn et al. .................. 345/179 |
| 6,321,158 B1 | * | 11/2001 | DeLorme et al. ........... 701/201 |
| 6,449,368 B1 | * | 9/2002 | Davis et al. .................... 381/1 |
| 6,522,311 B1 | * | 2/2003 | Kadowaki et al. ............. 345/7 |
| 2001/0035880 A1 | * | 11/2001 | Musatov et al. ............ 345/764 |

FOREIGN PATENT DOCUMENTS

GB         2278196 A        11/1994

(Continued)

OTHER PUBLICATIONS

Search Report for International application No. PCT/AU01/01267 (the present application is a national filing of this PCT).

*Primary Examiner*—Kee M. Tung
*Assistant Examiner*—Michelle K. Lay
(74) *Attorney, Agent, or Firm*—Dov Rosenfeld; Inventek

(57) ABSTRACT

An authoring system and authoring method to assigning a real geo-spatial position to sensory-effect data representing virtual sensations, including a virtual sound sensation. The system includes an author interface for displaying a representation of a real geo-space, means for accepting the sensory-effect data, and means for an author to assign the virtual sensory effect data to a location within the displayed representation corresponding to a real location within the geo-space, such that a user has the sensation of the virtual sound coming from the location assigned for the sensory-effect data.

34 Claims, 9 Drawing Sheets

FOREIGN PATENT DOCUMENTS

| WO | WO 93/02438 | 2/1993 |
| WO | WO 01/01295 A1 | 1/2001 |

* cited by examiner

AUTHORING SYSTEM

FIELD OF THE INVENTION

The present invention relates broadly to an authoring system which can be utilised to create a landscape data file for presentation to an exposee.

BACKGROUND OF THE INVENTION

Traditional virtual reality systems aim to provide an exposee with the experience of a completely artificially constructed landscape, ie a virtual reality. Virtual reality systems have so far been dominated by visual considerations. In keeping with the concept of creating a completely artificial environment, such virtual reality systems typically seek to eliminate any real or geo-spatial experience for the exposee.

In having that aim, it may be said that such systems neglect the beneficial experiences that result from being exposed to a real environment, and rather put the entire emphasis and burden on the ability of the system to attempt to recreate an ever more realistic, yet artificial, environment.

SUMMARY OF THE INVENTION

In accordance with a first aspect of the present invention there is provided an authoring system for assigning a geo-spatial position to sensory-effect data, said authoring system comprising an author interface for displaying a representation of a real geo-space, sourcing means for sourcing sensory-effect data and assigning means for enabling an author to assign said sensory effect data to a location within the representation corresponding to a real location within the geo-space at which delivery of the sensory-effect data is to be effected.

In one embodiment the authoring system further comprises trigger assigning means enabling the author to assign a trigger condition to said sensory-effect data, said trigger condition controlling the delivery of said sensory-effect data at said real location. Preferably the authoring system further comprises trigger condition meeting means enabling the author to satisfy a trigger condition within the representation to cause a representation of sensory-effect data associated with said trigger condition to be delivered at said interface.

Preferably, the sensory-effect data comprises one or more of the group of alpha numeric data, image data, sound data, smell data, temperature data, humidity data, wind data, pressure date and light data.

The alphanumeric data may comprise computer readable code for, in use, instructing the system to control presentation of the sound, image, smell, humidity, wind, pressure, or light data to an exposee.

The authoring system may comprise a user interface on which the geo-space is represented, the interface being arranged in a manner such as to enable, in use, a user to assign the geo-spatial position to the data by placing and manipulating markers on the interface.

The authoring system preferably comprises means for defining relationships between markers. The relationship may be one or more of defining a marker as a parent of, and/or a child of, and/or a grandparent of, and/or a grandchild of another marker, whereby respective markers inherit a functionality of their respective parent and/or grandparent.

The functionality of respective markers may comprise one or more of the group of a trigger marker, a motion marker, a sound marker, an image marker, an exposee marker representing the location of an exposee within the geo-space and position marker.

The trigger marker is advantageously arranged in a manner such that, in use, an associated event is triggered depending on the exposee entering a triggering zone of the trigger marker. The triggering zone may be of a circular shape. The triggering zone may alternatively be of any defined shape.

The motion marker may be arranged in a manner such that, upon being triggered by an associated triggering marker, a source of data for presentation to the exposee is being moved along predetermined paths. Alternatively, the motion marker may be arranged in a manner such that, upon being triggered by the associated triggering marker, the source of the data for presentation to the exposee is being attached to the exposee, whereby the movement of the source follows that of the exposee.

The motion marker may be arranged in a manner such that it provides its own triggering functionality.

The position marker may be arranged in a manner such that its movement within the geo-space represented on the user interface is dependant upon positioning data externally provided to the authoring system. The positioning data may be provided to the authoring system by way of a global positioning system (GPS).

The position marker may further or alternatively be arranged in a manner such that, in use, its orientation within the geo-space represented on the user interface is dependant upon orientation data externally provided to the authoring system. The orientation data may be provided, in use, by way of sensor means carried by the exposee.

The authoring system may be arranged to transfer the sensory-effect data having the geo-spatial position assigned to it to a rendering tool via a data carrier means comprising one or more of the group of a computer network, a portable data carrier, or a wireless data carrier for effecting the presentation of the sensory-effect data to the or an exposee.

The authoring system may further comprise a rendering tool for effecting the presentation of the sensory-effect data to the exposee.

Advantageously, the authoring system is arranged in a manner such that, in use, the effecting of the presentation of the sensory-effect data to the exposee can be manipulated in real-time by the user.

In accordance with a second aspect of the present invention there is provided a rendering tool arranged, in use, to effect presentation of sensory-effect data received from the authoring tool of the first aspect.

The invention may alternatively be defined as providing an authoring tool comprising means for creating a data stream which is a combination of data representing a real geo-space and data representing a sensory effect.

The invention may alternatively be defined as providing an authoring tool adapted to create a data stream useable by a presentation means to present a sensory effect to an exposee who uses moves through a real geo-space, said data stream comprising a combination of data representing said real geo-space, and data representing a sensory effect which is assigned to a geo-spatial location in said representation of said real geo-space.

In at least the preferred embodiments, the present invention seeks to provide a system in which the benefits of both virtual and actual reality can be combined so as to provide a more rewarding experience for the exposee.

In one further aspect the present invention provides a method of assigning a geo-spatial position to sensory effect data comprising the steps of displaying a representation of a real geo-space at an author interface, sourcing sensory-effect data, and assigning said sensory-effect data to a location within the representation corresponding to a real location within the geo-space at which delivery of the sensory-effect data is to be effected.

In one further aspect the present invention provides a method of enabling an author to assign a geo-spatial position to sensory-effect data comprising the steps of providing an author interface for displaying a representation of a real geo-space, providing sourcing means for sourcing sensory-effect data, and providing assigning means for enabling an author to assign said sensory effect data to a location within the representation corresponding to a real location within the geo-space at which delivery of the sensory-effect data is to be effected.

BRIEF DESCRIPTION OF THE DRAWINGS

Preferred forms of the present invention will now be described, by way of example only, with reference to the accompanying drawings.

DETAILED DESCRIPTION OF THE EMBODIMENTS

The authoring tool of the preferred embodiment allows sounds to be positioned in space, and for various sound behaviours to be specified. The authoring tool generates a Sonic Landscapes Scene (SLS) file as its output.

A rendering tool reads the SLS file, and generates a binaural feed to the user in response to GPS (user location) and compass (user head orientation) information. The user has the impression that a Sonic Landscape has been overlayed on real space.

The tools are sufficiently integrated to allow the author to interactively modify a Sonic Landscapes Scene while listening to the changes. Diagrams of the user interface and property sheets are included for clarity. These should not be considered prescriptive.

Figure 1:
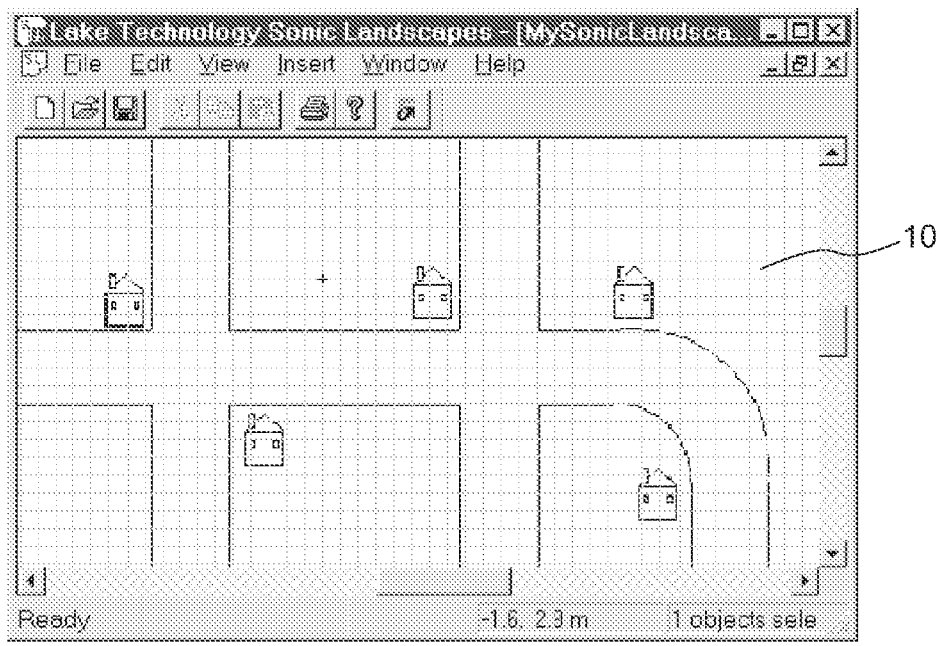
FIG. 1 shows an authoring tool user interface embodying the present invention.

As is shown in FIG. 1, the authoring tool defines a two dimensional scene 10, viewed from above, and allows it to be annotated with sounds, sound behaviours and bitmaps. The resulting sonic landscapes scene is stored in an .sls file.

The scene 10 is composed of two layers: a map layer, and a sound layer. FIG. 1 shows an example user interface only. The map layer (imported as a bitmap file) depicts a residential area to be annotated. The authoring tool overlays a 1 m grid.

Figure 2:
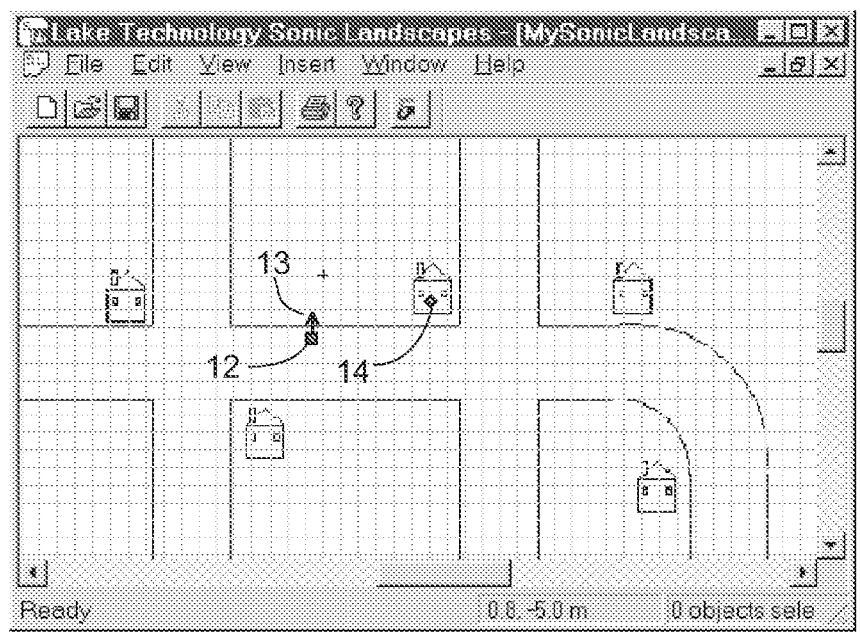
FIG. 2 shows a map and sound layers populated embodying the present invention.

FIG. 2 shows a listener object 12 and a sound source object 14 in the sound layer. In this example the listener object 12 is represented with a square, and the sound source object 14 with a circle. An arrow 13 shows which direction the listener object 12 is facing.

Figure 3:
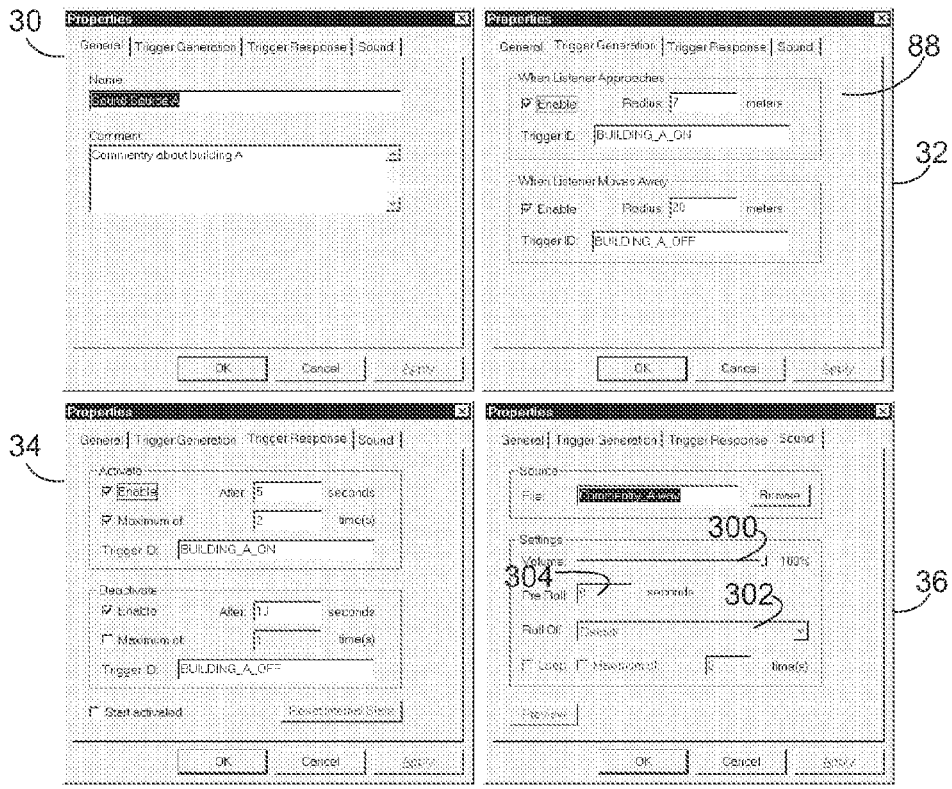
FIG. 3 shows sound object properties embodying the present invention.

The author can move the listener object 12 and sound source object 14 using the mouse. Double clicking on the sound source object 14 reveals a property sheet. Examples of property sheets 30, 32, 34 and 36 are shown in FIG. 3. The property sheets 30, 32, 34, 36 are able to name the sound source, specify when the sound source is played, and what sound is played.

Generally sound source objects are set to trigger when the listener object 12 approaches, and to switch off when the listener object 12 moves away.

Figure 4:
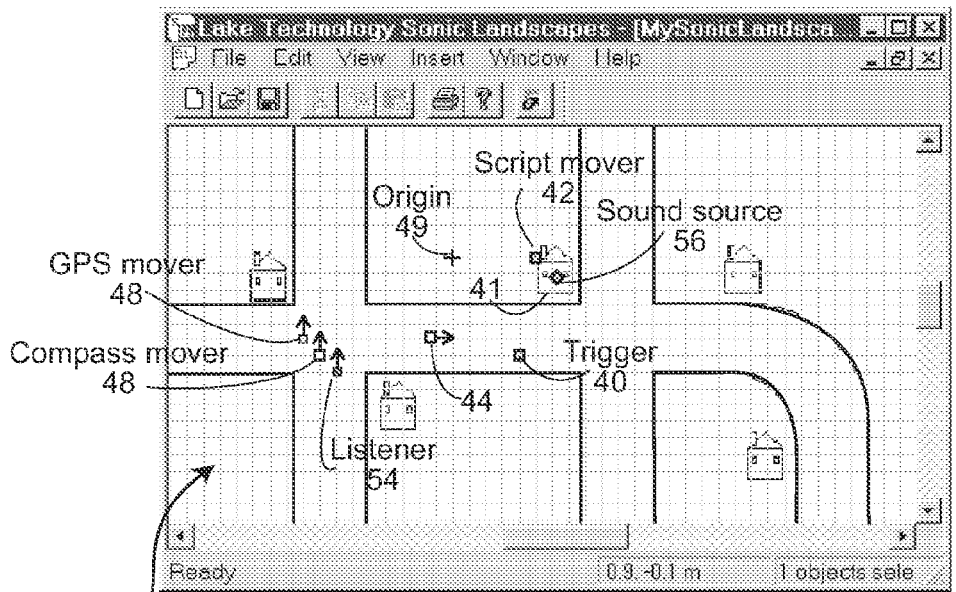
FIG. 4 shows an example of sound objects embodying the present invention.

As well as sound source objects and listener objects, a number of other objects can be provided, some of which are defined and illustrated in FIG. 4.

A trigger object 40 generate triggers when a listener approaches or moves away (square).

Script mover objects 42 follow a defined trajectory when triggered (square).

Keyboard mover objects 44 have position and orientation, and are moved using the cursor arrow keys (↑ moves forwards, ↓ moves backwards, ← moves left, and → moves right). These objects may be utilised to simulate movement of a "test" exposee.

Compass mover 46 objects can be used to input head orientation information into the rendering tool, and GPS mover objects 48 can be used to input user position information into the rendering tool.

Bitmap objects (not shown) allow a bitmap to be displayed and re-sized in either the Map or Sound layers. It is ignored by the rendering tool, but may be useful in the authoring tool. Most commonly the bitmap object is used to display a map in the map layer.

The exemplified sonic landscape scene 52 in FIG. 4 shows a number of objects in a typical arrangement. The listener 54 orientation is input using the compass mover 46, and the listener object 54 position is input using the GPS mover 48. The trigger 40 activates as the listener 54 approaches, and this causes the sound source 56 to start playing, and the script mover 42 to start moving.

A origin point 49 is defined within the sonic landscape scene 52, and acts as an internal reference point for the assignment of the geo-spatial data to the respective objects.

Inheritance

Inheritance is an important concept in the Sonic Landscapes Scene of the preferred embodiment. Objects may either exist independently, or as children of other objects. An object may have any number of children, but can have only one parent. An object inherits some of the characteristics of its parent. The most important characteristics are position and orientation. Thus if a parent moves, all children move by the same amount. A child inherits the orientation of its parent, unless it has an orientation of its own.

Inheritance has many uses. In FIG. 4, for example, the sound source 56 is a child of the script mover 42. When the script mover 42 is triggered and starts to move, the sound source 56 follows the same trajectory (technically, the position of a child relative to its parent is fixed).

Also in FIG. 4, the listener 54 is a child of the compass mover 46, which in turn is a child of the GPS mover 48. The listener 54 inherits its position and orientation from the compass mover 46. The compass mover 46 has its own sense of orientation (derived from external hardware with the help of the rendering tool), and inherits position from the GPS mover 48 (which gets its position from external hardware with the help of the rendering tool).

The net effect is that the listener position can input by the GPS hardware, and the listener orientation can be input by the compass hardware.

Figure 5:
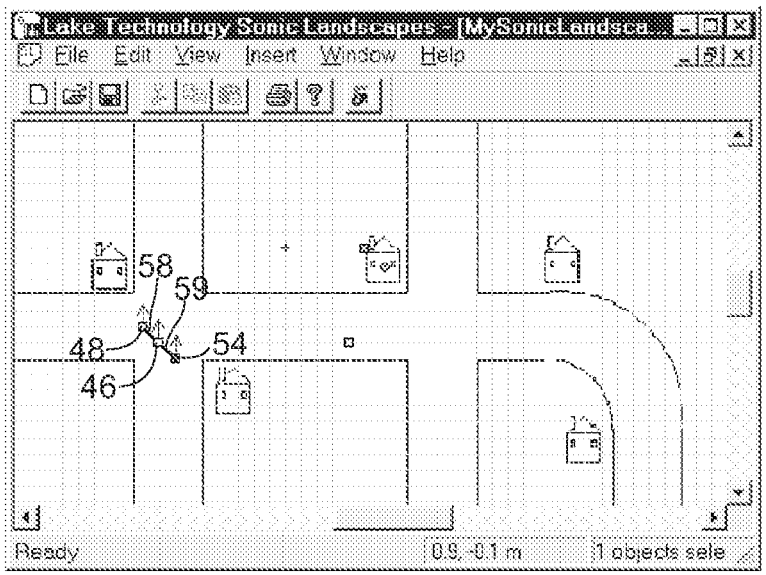
FIG. 5 shows an object inheritance embodying the present invention.

FIG. 5 shows that if the compass mover 46 is selected, a line 58 is drawn to its parent (GPS mover 48), and a line 59 is drawn to its child (listener 54). This allows the author to check family relationships.

The advantage of an inheritance model is that complex behaviours can be built up using different family trees. For example, several different script mover objects can be made children of each other, and the trajectory of the lowest child is the sum of the trajectories of all its parents.

Triggering

Triggers activate sound source and script mover objects. A trigger has an ID, and can be generated using a trigger object.

Figure 6:
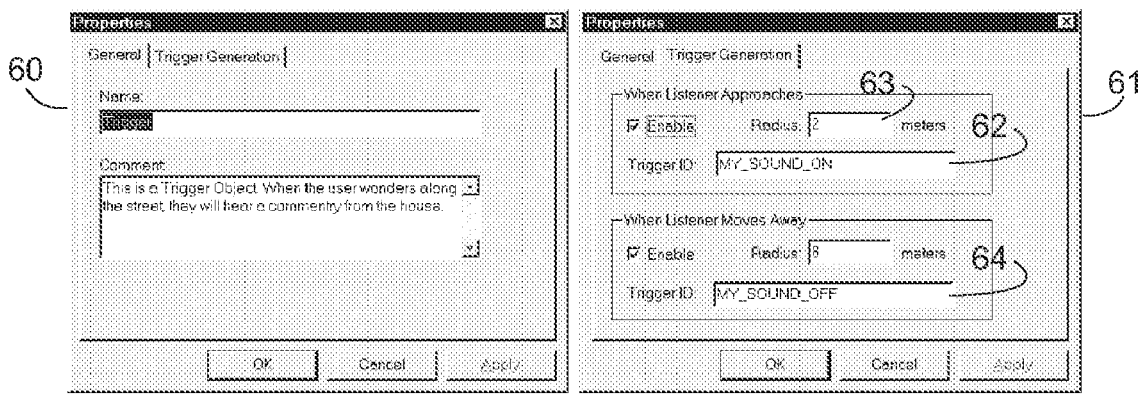
FIG. 6 shows trigger object properties embodying the present invention.

FIG. 6 shows the property sheets 60, 61 for the trigger object 40 in FIG. 4. When the listener 54 in FIG. 4 moves within 2 m of the trigger object 40, it generates trigger ID MY_SOUND_ON (62, FIG. 6). When the listener then moves over 8 m away, it generates trigger ID MY_SOUND_OFF (64, FIG. 6).

The trigger object 40 simply generates trigger IDs 62, 64. It is up to other objects to respond to them.

Figure 7:
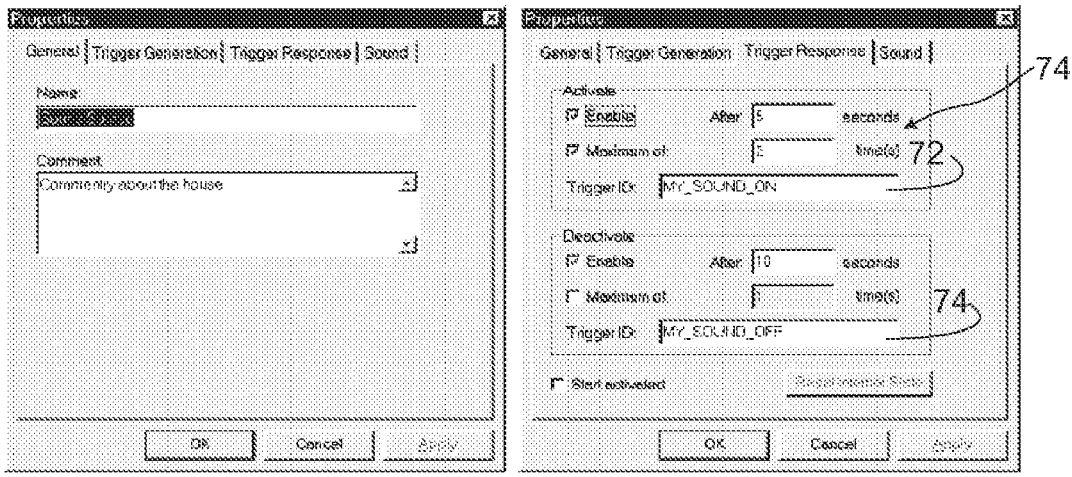
FIG. 7 shows sound source properties embodying the present invention.

Both the script mover 42 and the sound source 56 in FIG. 4 respond to trigger ID's generated by the trigger object 40. FIG. 7 shows the configuration of the sound source 56. It is set to play 5 seconds after trigger ID MY_SOUND_ON (72), and stops playing 10 seconds after trigger ID MY_SOUND_OFF (74).

The effect for the user is that the commentary starts to play from the house 41 (FIG. 4) when they approach the trigger object 40, and stops as they walk away. The commentary will only play twice 73, even if the user keeps returning to the trigger object 40.

Figure 8:
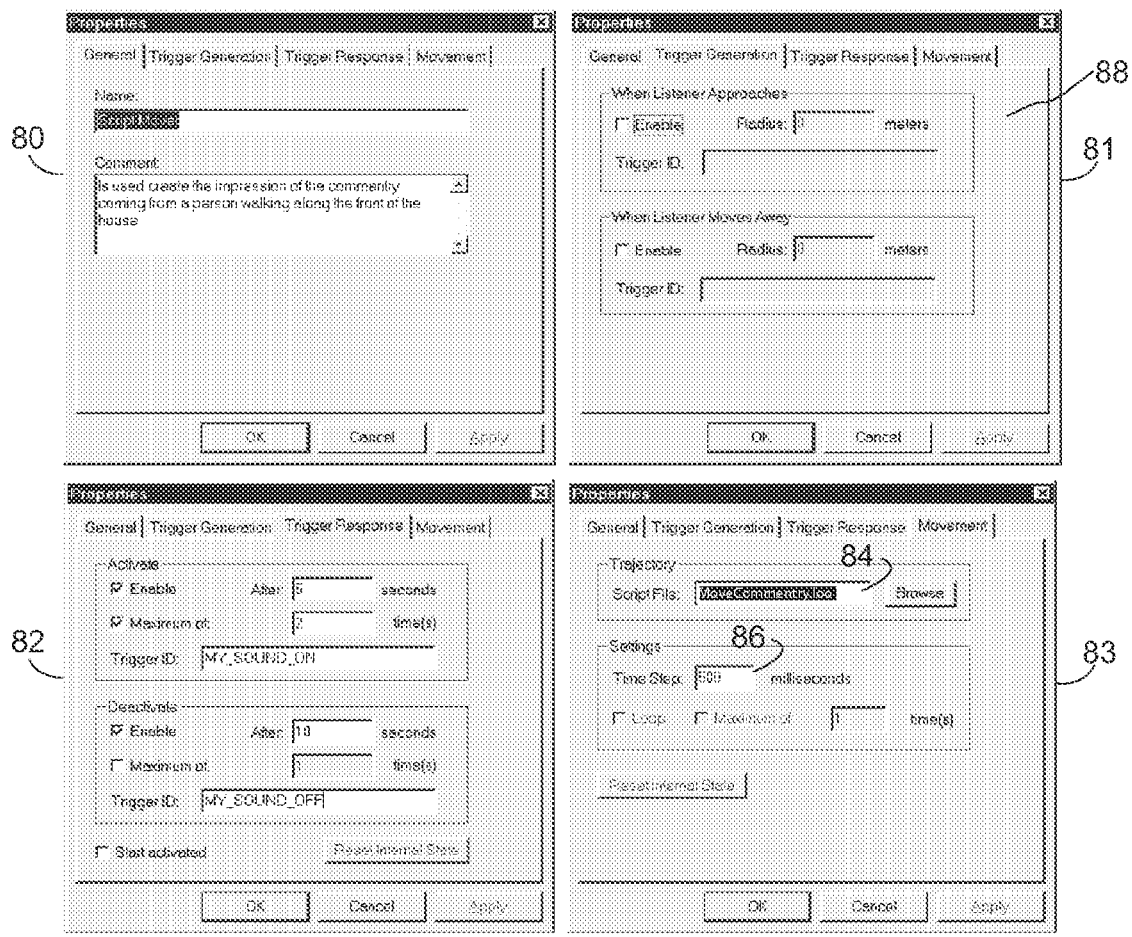
FIG. 8 shows script mover properties embodying the present invention.

FIG. 8 shows the property sheets 80, 81, 82, 83 for the script mover 42 of FIG. 4. The settings for trigger response are the same as for the sound source 56, meaning that the script mover 42 moves at the same time as the sound source 56 plays. Notice how the trajectory is described using a .loc file 84 which can contain a series of location values, and the speed of the trajectory is specified using the time step parameter 86.

Both the sound source sheets (FIG. 3) and the script mover sheets (FIG. 8) contain a trigger generation property page 88 similar to the trigger object. In fact, both the sound sources and the script movers can act like trigger objects. This allows the author to quickly create sounds that trigger when the listener approaches, without having to create a specific trigger object for each sound.

User Interface

Figure 9:
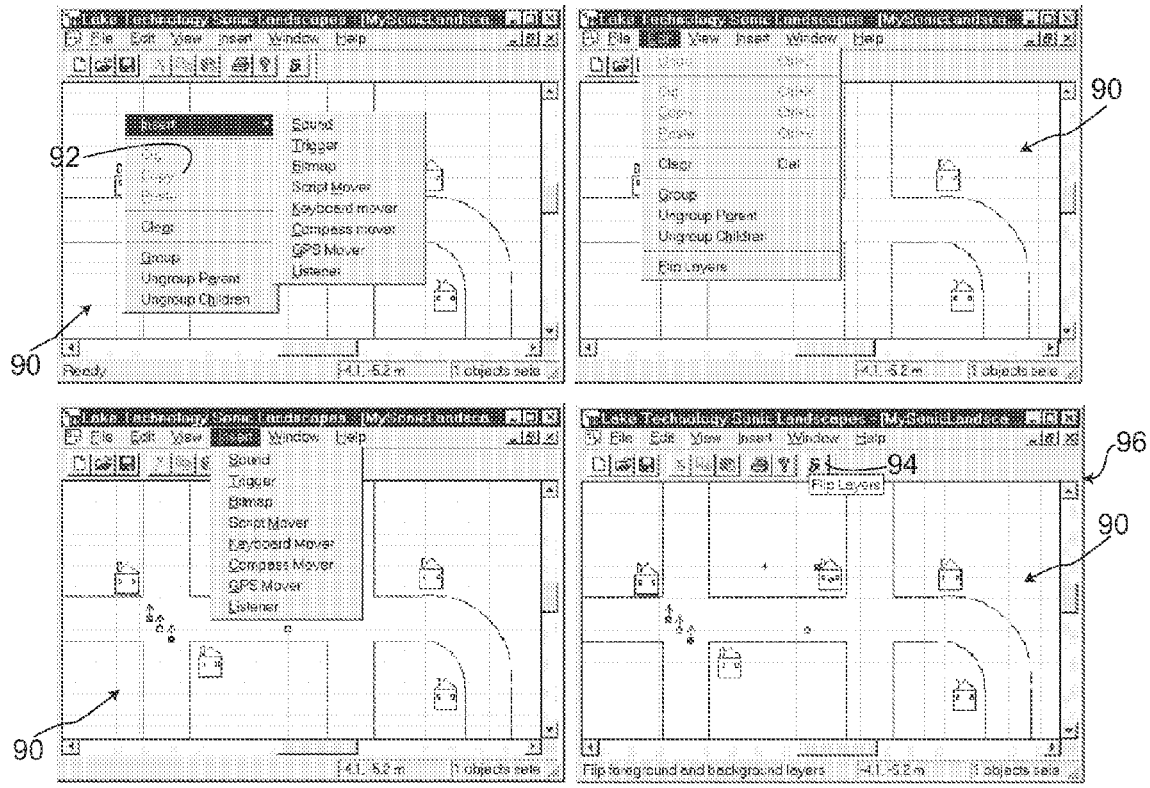
FIG. 9 shows an authoring tool user interface embodying the present invention.

FIG. 9 shows some of the user interface features of the authoring tool. Right clicking on the sonic landscapes scene 90 generates a pop-up menu 92 that allows objects to be added and deleted, as well as inheritance relationships to be altered. All these options are repeated in the menus.

The FLIP button 94 on the toolbar 96 brings the Map layer to the foreground and hides the sound layer. The map layer can now be edited (normally it does not respond to mouse input).

Other controls (not shown in FIG. 9) can be Stop/Play/Pause buttons on the toolbar, which control the playing of sounds and other sound behaviours. These are used to control the rendering tool.

The user may zoom in and out of a sonic landscape using the mouse wheel.

Preview

The authoring tool of the preferred embodiment is closely integrated with a rendering tool, which allows the user to listen to changes to the sonic landscapes scene as they are made. The author can simulate the effect of the listener moving through the scene by dragging the listener icon with the mouse, or making the listener a child of a keyboard mover object.

Object Reference

This section gives a more detailed description of each of the object types definable as part of the preferred embodiment.

Listener

Figures 10, 11:
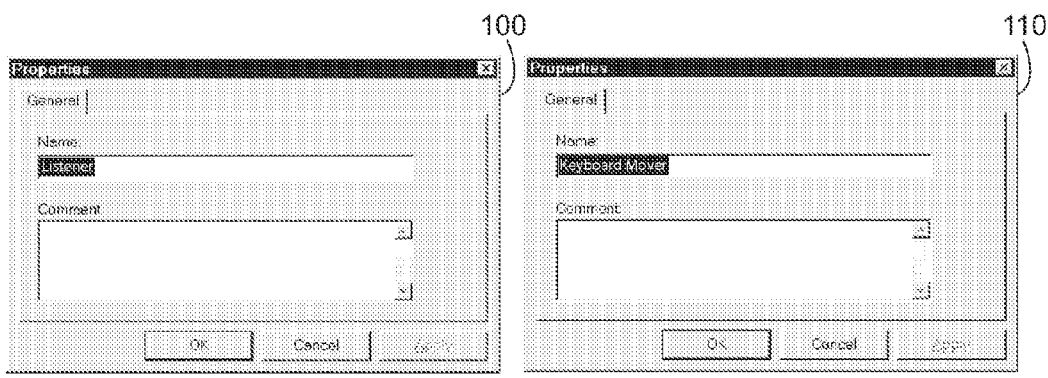
FIG. 10 shows listener properties embodying the present invention.
FIG. 11 a property sheet for a keyboard mover embodying the present invention.

Defines the listener position. It is often made a child of the keyboard mover, compass mover or GPS mover discussed below. The property sheet 100 is shown in FIG. 10.

Sound Source

Defines the sound sources in the sonic landscapes scene. The property sheet is shown in FIG. 3. A number of options can be included for volume 300, roll off characteristics 302, looping etc.

Several pre-specified roll-off models are based on two ellipses with no output occurring outside the outer ellipse and a constant output inside the inner ellipse. A log roll-off can be provided between the two. Further modified alternatives including Low Pass filtering to model the absorptive properties of air, to give a sense of distance could, for example, be provided.

Ideally it is possible to specify an arbitrary period of silence (pre roll) 304 before each file is rendered.

If a sound object receives an exit trigger event while playing, it plays the current sound file to completion, and then stops.

Sound Stack

A sound stack can be provided which is similar to a sound source, but contains a number of sound files that can loop and stack in various ways. For example:

1 Have lists of sound files that play either in sequence or in a random order until all content has played.

2 Lists can either play once or loop.

3 If a sound object receives an exit trigger event while playing, it plays the current sound file to completion, and then stops.

4 Looped/stacked sounds remember their status, and resume if a subsequent trigger activation event is received.

Trigger

A trigger responds to approaching listeners by generating trigger ID's. It is used to trigger sound sources and other behaviours as discussed previously. The property sheets 60, 61 are shown in FIG. 6, and the behaviour has been described above:

1 Triggers can be configured to generate events when a listener approaches, moves away, or both. The events that each trigger produces has a text to trigger ID 2 Two concentric circles can be used define a trigger's approach/exit area.

3 Complex triggering behaviours can be achieved using multiple triggers. For example, a sound source may receive an activation trigger ID from one trigger object, and a deactivation trigger ID from another trigger object.

Polygon Trigger

A polygon trigger is similar to a trigger, except the trigger approach/exit area can be defined using two arbitrary polygons.

Script Mover

A script mover moves along a defined trajectory described by a .loc script file 84 the format of this file can consist of a series of location points. The property sheet is shown in FIG. 8. The speed of the trajectory is defined by the time step parameter 86.

The .loc script file 84 can describe the trajectory as a list of vertices, and the script mover moves along straight lines between the vertices. The position can be interpolated, and time step can be the time in ms to travel between two vertices.

A script mover can be a child of a listener, and by attaching sound sources as children, these can be made to move relative to the listener.

Keyboard Mover

The keyboard mover moves under the control of the keyboard, and is a useful tool for the author in testing scenarios. The property sheet 110 is shown in FIG. 11.

Compass Mover

The compass mover is used to input user head orientation information into the rendering tool. The property sheet allows for configuration of the compass hardware (dependent on the specific compass being used).

GPS Mover

The GPS mover is used to input user position information into the rendering tool. The property sheet allows: configuration of the GPS hardware, including initialisation commands (dependent on the specific GPS receiver being used); and entering of the GPS coordinates of the sonic landscapes scene origin.

Bitmap

Allows a bitmap to be displayed and re-sized in either the map or sound layers. It is ignored by the rendering tool, but may be useful in the authoring tool. Most commonly the bitmap object is used to display a map in the map layer.

Theme Zone

The theme zone object defines a region where a number of sounds are randomly positioned and looped to generate a sonic ambience, without the author needing to precisely specify which sound is played where the main features can include:

1 When in a theme zone, a 'server' places sound content at random positions around the listener. Each content item remains stationary while playing.

2 Zone areas can be defined by an arbitrary polygon.

3 A defined number of sounds can be played at any one time. When a sound finishes a new sound is served.

4 All sounds in a theme zone have the same roll-off characteristics.

5 When the listener leaves the zone no new sounds are served. Existing sounds play until they finish.

Other Objects Can Be Provided Including:

1 Triggering trigger events based on time: absolute, or relative to start.

2 System messages e.g. 'Your batteries are flat—go home.'

3 Sleep mode/loiter mode e.g. the system prompts the user to keep moving.

4 If no sound sources are present, a site wide theme zone is played.

Rendering Tool

The rendering tool renders the sounds and sound behaviours, and manages the GPS/compass input and output. It has a stop, play, and pause control, which allows the renderer to be reset for a new user. No specific constraints are placed on the implementation—which is largely dependent on the hardware being used.

Software Structure

This section is not prescriptive, and contains an example implementation of a combined authoring/rendering tool using Microsoft Visual C++ and MFC on a PC platform.

Threading

Figure 12:
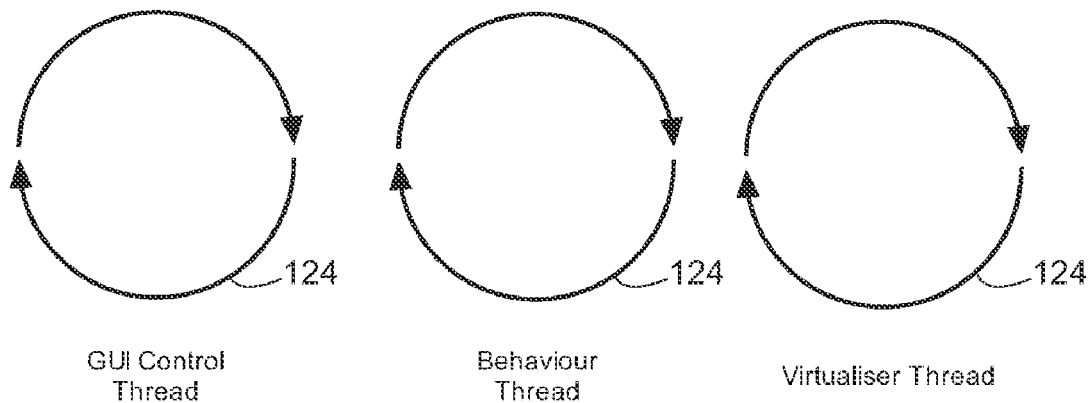
FIG. 12 shows multiple threads embodying the present invention.

Three interacting threads are provided for the real time interactive operation of the system. These be defined as follows, with reference to FIG. 12:

1 The GUI thread 120 controls the user interface, editing, and serialisation. This is where the authoring tool component of the software operates.

2 The behaviour thread 122 is where the Rendering Tool component of the software operates. It determines when a sound is to play; manages the triggering architecture; and realises other sound behaviours, such as the script mover object.

3 The virtualiser thread 124 performs binaural rendering of sounds under the control of the Behaviour Thread.

The three threads 120–124 operate in an ordered priority sequence with virtualiser thread 124 having the highest priority, followed by behavious thread 122 and GUI thread 120.

Figure 16:
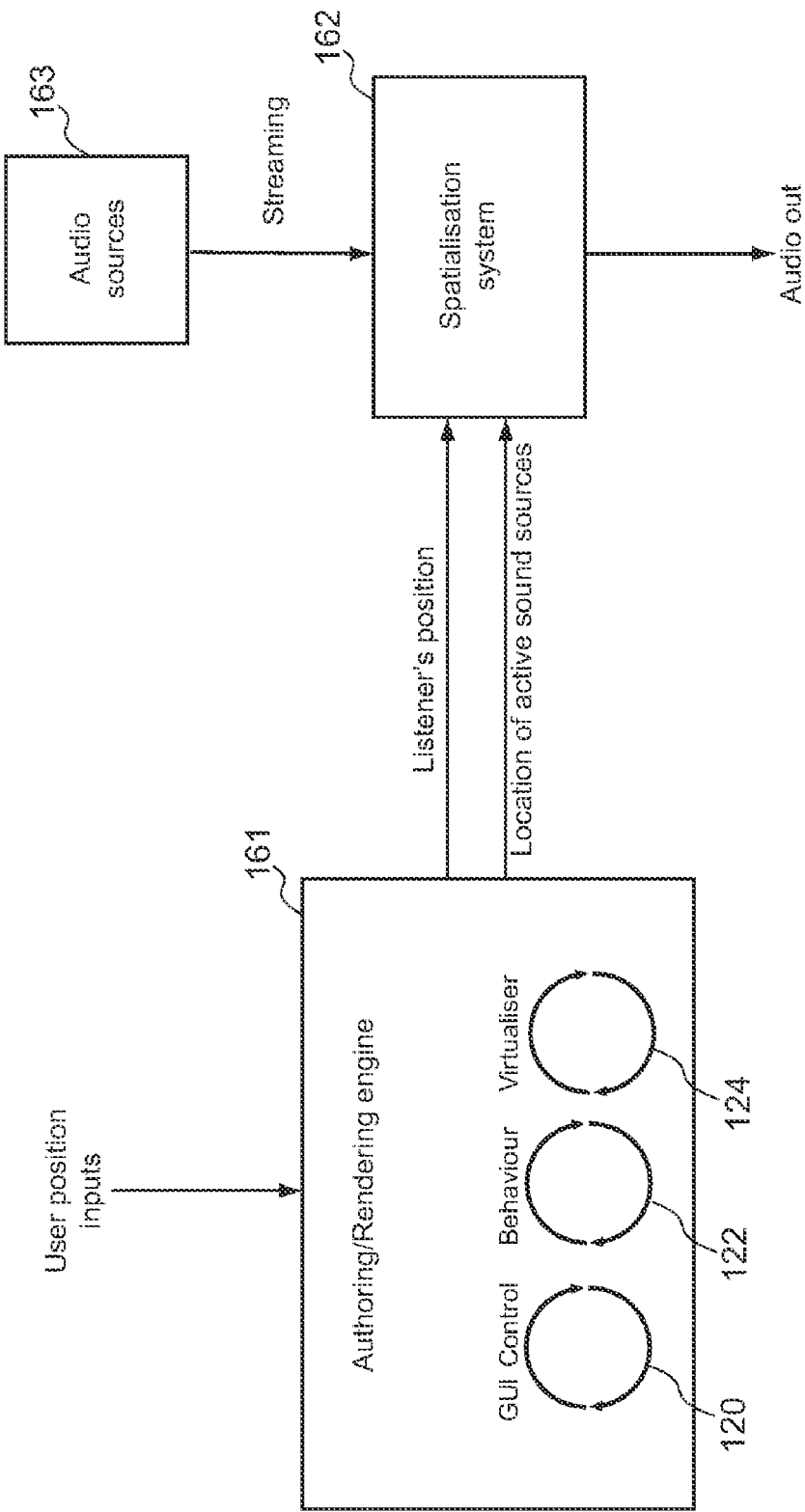
FIG. 16 shows an example of an environment in which the preferred embodiment operates.

Turning now to FIG. 16, there is illustrated schematically the example environment in which the authoring tool and rendering engine operate. The three threads 120–124 run within the authoring/rendering engine 161 and output a listeners position and location of active sound sources to a spatialization system 162 which also takes as its input a series of streamed audio sources 163 corresponding to the location of active sound sources. The spatialization system 162 binauralizes the streamed audio so as to locate it at a predetermined position around the listener in accordance with the difference between the listener's position and the location of active sound sources.

The spatialization system 162 system can take many forms. For example, U.S. Standard application Ser. No. 08/893,848 which claims priority from Australian Provisional Application No. PO0996, both the contents of which are specifically incorporated by cross reference, discloses a system for rendering a B-formatted sound source in a head tracked environment at a particular location relative to a listener. Hence, if the audio tracks are stored in a B-format then such a system, suitably adapted, can be used to render the audio tracks. One example of where such a system is suitable is where the B-format part of the rendering to be done centrally, and the headtracking part (which is applied to the B-format signal to generate headphone signal) is done locally. B-field calculation can be expensive and may be done centrally. However, central computation incurs communication delays, and this may have the effect of introducing latency in position. The headtracking can be done locally because this is very sensitive to latency. Alternatively, Patent Cooperation Treaty Patent PCT/AU99/00242 discloses a system for headtracked processing for headtracked playback of audio and, in particular, in the presence of head movements. Such a system could be used as the rendering engine by rendering the audio track to a predetermined format (e.g. Dolby 5.1 channel surround) so as to have a predetermined location relative to a listener, and, in turn, utilising the system described in the PCT application to then provide for the localisation of an audio signal in the presence of head movements.

In the further alternative, Patent Cooperation Treaty Patent PCT/AU99/00002 discloses a system for rendering audio such as Dolby 5.1 channel surround to a listener over headphones with suitable computational modifications. By locating a sound around a listener utilising panning of the sound source between virtual speakers and subsequently rendering the speakers utilising the aforementioned disclosure, it is again possible to spatialize a sound source around a listener.

Obviously, other known techniques for spatializing sound over headphones could be utilised.

Class Hierarchy

Figure 13:
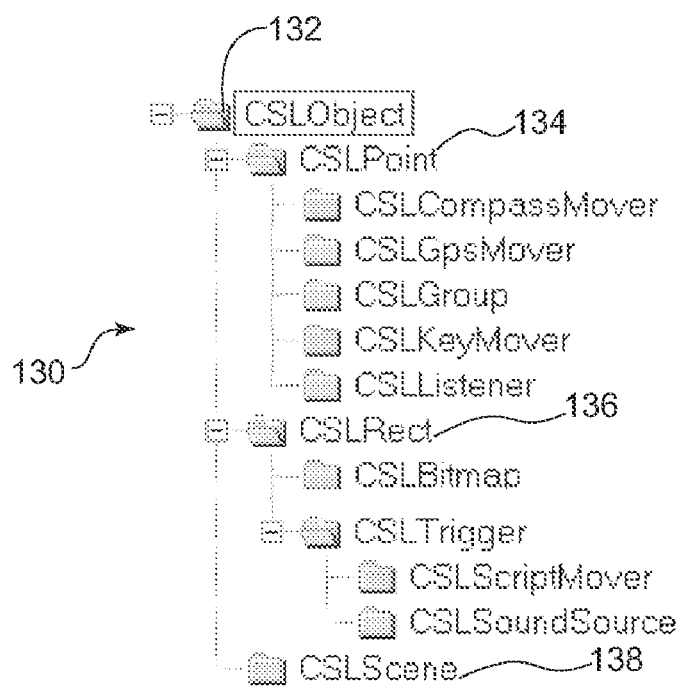
FIG. 13 shows an example C++ class hierarchy embodying the present invention.

Each object type is implemented using a C++ class. An example class hierarchy 130 is shown in FIG. 13. Each CSL objects contain methods for both the GUI Control process (used by the authoring tool), and the behaviour process (used by the rendering tool). The virtualiser is treated as a separate entity that is accessed by the behaviour thread via an audio API:

1 CSLObject 132 is the base class, and contains much of the infrastructure required by the MFC document/view architecture. This class also implements the inheritance model described above.

2 CSLPoint 134 and CSLRect 136 derive from CSLObject 132 and include methods for point objects (such as a sound source) and objects that cover an area (such as triggers).

3 CSLScene 138 is a special case, and embodies the whole sonic landscapes Scene. All independent objects in a sonic landscapes scene are in fact children of a CSLScene.

4 All other objects can be derived from CSLRect 136 and CSLPoint 134, and contain member functions and variables to implement GUI and rendering functionality.

Although, the skilled programmer would maintain a high degree of flexibility over the software design, example CSLObject member functions and variables are listed below:

TABLE 1

CSLObject Member Functions

| Member Function | Thread Usage | Explanation |
|---|---|---|
| AbsToRel | GUI + Behaviour | Converts a position from absolute coordinates to coordinates relative to an object's parent. |
| AddChild | GUI | Adds a child to the object. The behaviour thread must be frozen using LockFlushBehaveThread before this is called. |
| AddChildrenTo | GUI | Adds a child to a third party object. The behaviour thread must be frozen using LockFlushBehaveThread before this is called. |
| AddPropPages | GUI | Called to display the property page for an object when it is double clicked in the GUI. |
| AddToParent | GUI | Informs a object who its parent is. |
| Behave | Behaviour | This is the main function called in the behaviour thread. An object responds by realising it's programmed behaviour e.g. a CSLScriptMover will move an increment along its trajectory. Behave is passed a reference to a CTrigState object. This is used to communicate trigger ID events between objects. |
| ChildToParent | GUI | Converts a position from coordinates relative to the object's parent (child coordinate system) to coordinates relative to the object's grand parent (parent coordinate system). |
| Draw | GUI | Draws the GUI representation of the object into the View. Called by CSLView |
| DrawLinks | GUI | Draws lines from the object to all its next of kin (i.e. parent and children). |
| EnclosedByBitmap | GUI | Determines whether a given region is completely enclosed by a bitmap. This is used to reduce flicker when redrawing. For example, if an object is invalidated, it is not necessary to paint the invalidation region with the background colour if a bitmap will be drawn into this region anyway. |
| GetAbsOrient | GUI + Behaviour | Returns the object's absolute orientation e.g. for a CSLListenter this is the direction the listener is facing. The absolute orientation is the sum of the relative orientation of itself, and all its ancestors. |
| GetAbsPos | GUI + Behaviour | Returns the objects position in absolute world coordinates (meters). This must be calculated since an object only normally stores its position in coordinates relative to its parent. |

TABLE 1-continued

CSLObject Member Functions

| Member Function | Thread Usage | Explanation |
| --- | --- | --- |
| GetDeepBound | GUI | The deep bound is the bound in world coordinates of the object and all its children. This corresponds to a bounding rectangle (in meters) which encloses the object and all its descendents. |
| GetDoc | GUI | Returns a pointer to the document the object belongs to. The resulting pointer is generally used to pass redraw hints to the document's Views. |
| GetExtraBoundLPDeep | GUI | Returns the bound of the object and its descendents in logical coordinates. This corresponds to the displayed size which is a function of the physical size (meters), the current zoom factor, and the extra size required to display the object as an icon. |
| GetExtraBoundLPShallow | GUI | Returns the bound of the object in logical coordinates. This corresponds to the displayed size of the object, which is a function of its physical size (meters), the current zoom factor, and the extra size required to display the object as an icon. |
| GetHandleText | GUI | Returns a text string containing the object's position. The View presents this information in the main application window status panel. |
| GetKeyStatus | GUI + Behaviour | Returns the status of the keyboard cursor keys. Used by CSLKeyMover, to control the object's position and orientation using the keyboard. |
| GetMoveHandle | GUI | Returns a flag indicating how the object will respond to attempts to move it using the mouse. |
| GetOrient | GUI + Behaviour | Returns the object's relative orientation. For example, the bearing a CSLCompassMover object reads from the digital compass hardware. |
| GetPos | GUI + Behaviour | Returns the object's position relative to its parent. |
| GetSLMainWnd | GUI | Returns a pointer to the application's main window. Used by the Behaviour thread to post redraw hints to the GUI thread. These hints are captured by CMainFrame. |
| HasParent | GUI | Checks to see whether a third party object is a parent of this object. |
| HitTest | GUI | Determines whether the object should report itself selected in response to a user mouse click. |
| InvalidateBehaveFlag | GUI + Behaviour | Called to invalidate the object's behaviour flag. The behaviour flag, mt_bBehaveInvalid, tells the Behaviour Thread that an object's position or orientation has been modified by the GUI thread. |
| InvalidateDeep | GUI | Invalidates the object's deep bound. This area is then redrawn by the view. |
| InvalidateExpandedDeep | GUI | Invalidates an inflated version of the object's deep bound. Used when the object has been moved in the Behaviour thread, and the invalidation region must be the superset of the old and the new positions. |
| InvalidateLinksDeep | GUI | Invalidates the object's deep bound, and if necessary, the line between the object and its parent. |
| InvalidateLPDeep | GUI | Invalidates the object's deep bound. This area is then redrawn by the view. |
| InvalidateLPShallow | GUI | Invalidates the object's shallow bound—which does not include the object's descendents. |
| InvalidateMove | GUI | Invalidates an inflated version of the object's deep bound. Used when the object has been moved in the Behaviour thread, and the invalidation region must be the superset of the old and the new positions. |
| InvalidateParentDeep | GUI | Invalidates the deep bound of the object's parent. |
| InvalidateShallow | GUI | Invalidates the object's shallow bound. This does not include the object's descendents. |
| KillAllChildren | GUI | Deletes all the object's descendents. The behaviour thread must be frozen using LockFlushBehaveThread before this is called. |
| MoveHandle | GUI | Instructs the object to move, and supplies a flag specifying how the object is to move. The flag has usually been previously extracted from the object using GetMoveHandle. |
| Properties | GUI | Displays the object's properties. This is called by the View after the user has double clicked on the |

TABLE 1-continued

CSLObject Member Functions

| Member Function | Thread Usage | Explanation |
|---|---|---|
| | | object. Note that the Behaviour thread is frozen using LockFlushBehaveThread before this is called. |
| RelToAbs | GUI + Behaviour | Converts a position from coordinates relative to the object's parent to absolute coordinates. |
| RemoveChild | GUI | Removes a third party object from the object's list of children. Note that the Behaviour thread is frozen using LockFlushBehaveThread before this is called. |
| RemoveFromParent | GUI | Removes an third party object from the parent's list of children. Note that the Behaviour thread is frozen using LockFlushBehaveThread before this is called. |
| Serialize | GUI | Serializes the object's state and the state of all it's descendents. |
| SetAbsPos | GUI + Behaviour | Sets the position of the object in absolute coordinates. |
| SetComment | GUI | Sets the object's comment field. |
| SetName | GUI | Sets the object's name. |
| SetPos | GUI + Behaviour | Sets the position of the object in coordinates relative to the object's parent. |
| ShowLinksTo | GUI | Determines whether to draw links to the object's children. Is used to prevent the drawing of links to the scene node, CSLScene. |
| Update | GUI | Used to send a redraw hint to all the views that belong to the object's document. |
| UpdateDeepBound | GUI | Tells the object to recalculate its deep bound. For example, this is called if one of the object's children has been moved. |
| UpdateShallowBound | GUI | Tells the object to recalculate its shallow bound. For example, this is called if the object's size has been changed. |
| UsePropPages | GUI | Called after an object's properties have been changed this function applies the changes to the object's internal state. |

TABLE 2

CSLObject Member Variables

| Member Variable | Thread Usage | Notes |
|---|---|---|
| m_colDraw | GUI | Stores the colour the object should be drawn in. |
| m_frDeepBound | GUI | Stores the object's deep bound. |
| m_frShallowBound | GUI | Stores the object's shallow bound. |
| m_listChild | GUI + Behaviour | Stores the object's list of children. Note: this list is not thread safe. Thread synchronisation is achieved by: only altering this list in the GUI thread; and ensuring the Behaviour thread is first frozen using LockFlushBehaveThread. |
| m_pParent | GUI + Behaviour | This is accessed in both threads, but only modified in the GUI thread when the Behaviour thread is frozen using LockFlushBehav Thread. |
| m_propObject | GUI | This is used to create the object's property window which is displayed when the object is double clicked in the GUI. |
| m_sComment | GUI | Stores the object's comment. |
| m_sName | GUI | Stores the object's name. |
| mt_bBehaveInvalid | GUI + Behaviour | An important multi threaded flag used by the GUI thread to indicate to the Behaviour Thread that an object's position or orientation has changed. For example, is a listener's position is changed in the GUI thread (by using the mouse) the flag is set, and the Behaviour thread responds by informing the virtualiser thread of the change. |

It should be noted that there are a limited number of variables are designed to be simultaneously read and written to by the GUI and behaviour threads. These are identified with the mt_prefix e.g. mt_fpPos. These variables are only ever accessed through thread safe access functions e.g. SetPos, SetOrient, SetRectPos, SetRotateKey, SetMoveKey, and InvalidateBehaveFlag.

Some member functions are called (by the GUI thread) when the Behaviour Thread has been stopped using CSLDoc::LockFlushBehaveThread. Examples are Serialize, AddChild, AddChildrenTo and UsePropPages. This simplifies the multi-threaded design of these functions.

The behaviour thread is invoked using CSLDoc::InitBehaveThread and its top level is CSLDoc::BehaveThreadFunc. To simplify the multi-threaded design of the software, the behaviour thread only accesses a limited number of variables. More complicated operations are achieved by posting messages to the GUI thread using ::PostMessage. For example, when CSLCompassMover detects a new compass orientation this can be stored directly (in the behaviour thread) using SetOrient. However all the GUI redrawing is performed in the GUI thread in response to a HINT_SLOBJECT_NEWORIENT hint.

The system can use three types of coordinates: world coordinates, logical coordinates and device coordinates. World coordinates correspond to real sizes in meters. Logical coordinates are an intermediate coordinate system that is independent of display medium device coordinates are specific to the display medium, and are generally in pixels. Two common device media used by SLEdit are the computer screen and the printed page.

In the following, two example scenarios illustrating the working of preferred embodiments of the present invention will be described with reference to FIGS. 14 and 15.

Figure 14:
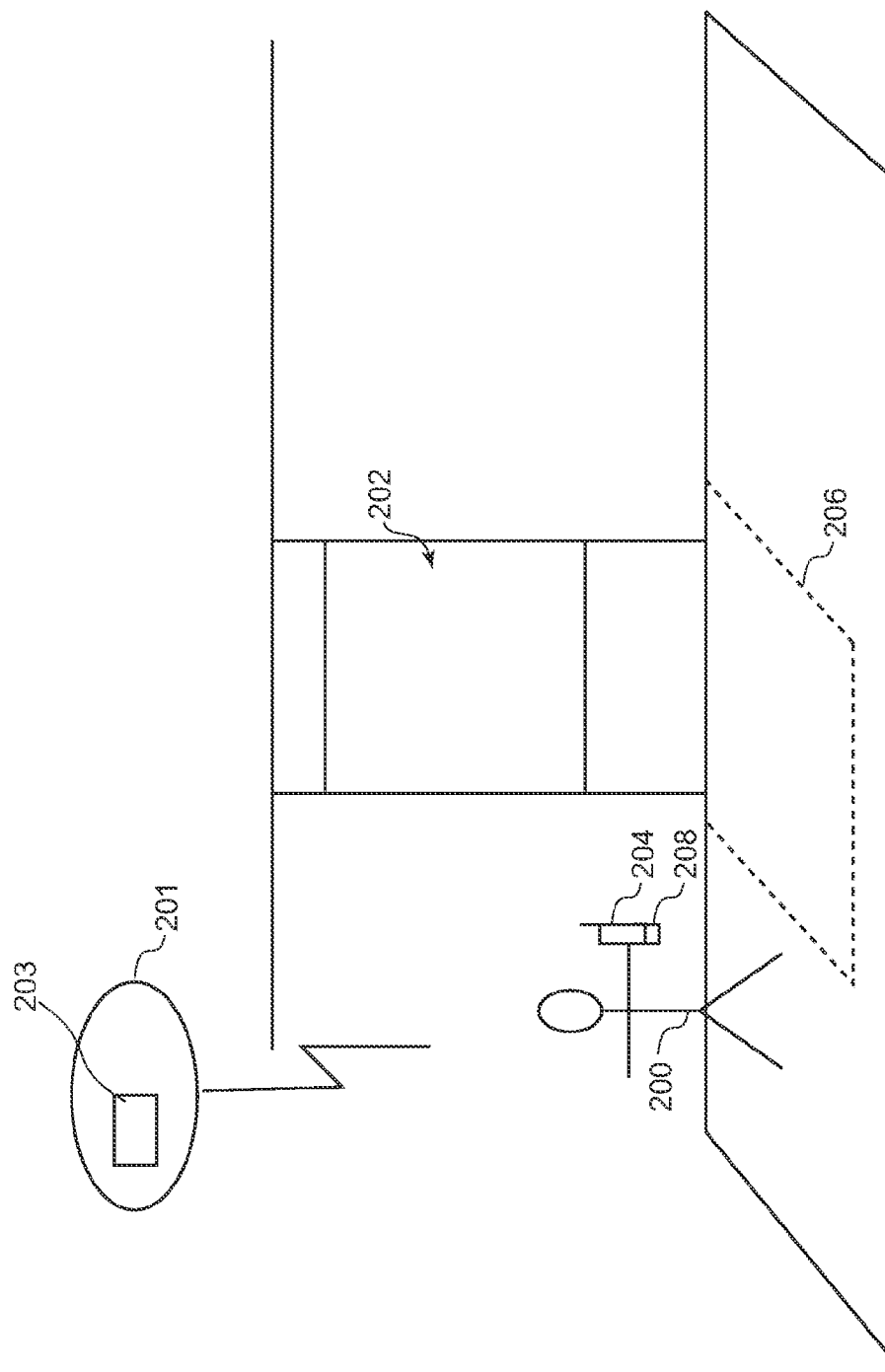
FIG. 14 shows an example of a scenario illustrating the working of one embodiment of the present invention.

Turning initially to FIG. 14, there is illustrated a person 200 walking along a shop-front window 202. The person is carrying a mobile phone 204. The owner of the shop associated with the shop-front window 202 has created a sonic landscape scene data, more particularly a special offer voice message to be presented to the person 200 whilst walking within a predetermined area 206 in front of the shop-front window 202.

In this scenario, the mobile phone 204 comprises a global positioning system (GPS) system 208 by way of which the position of the phone 204 can be traced by a rendering tool subscriber system 201 to which the owner of the shop associated with the shop-front window 202 has submitted the created sonic landscape scene data. Accordingly, once the person 200 (i.e. the mobile phone 204) enters into the area 206, which has been defined within a geo-space on an authoring tool 203 under operation by the subscriber rendering tool, the special offer voice message is automatically presented to the person 200 through an automated call to the mobile phone 204 of the person 200.

Figure 15:
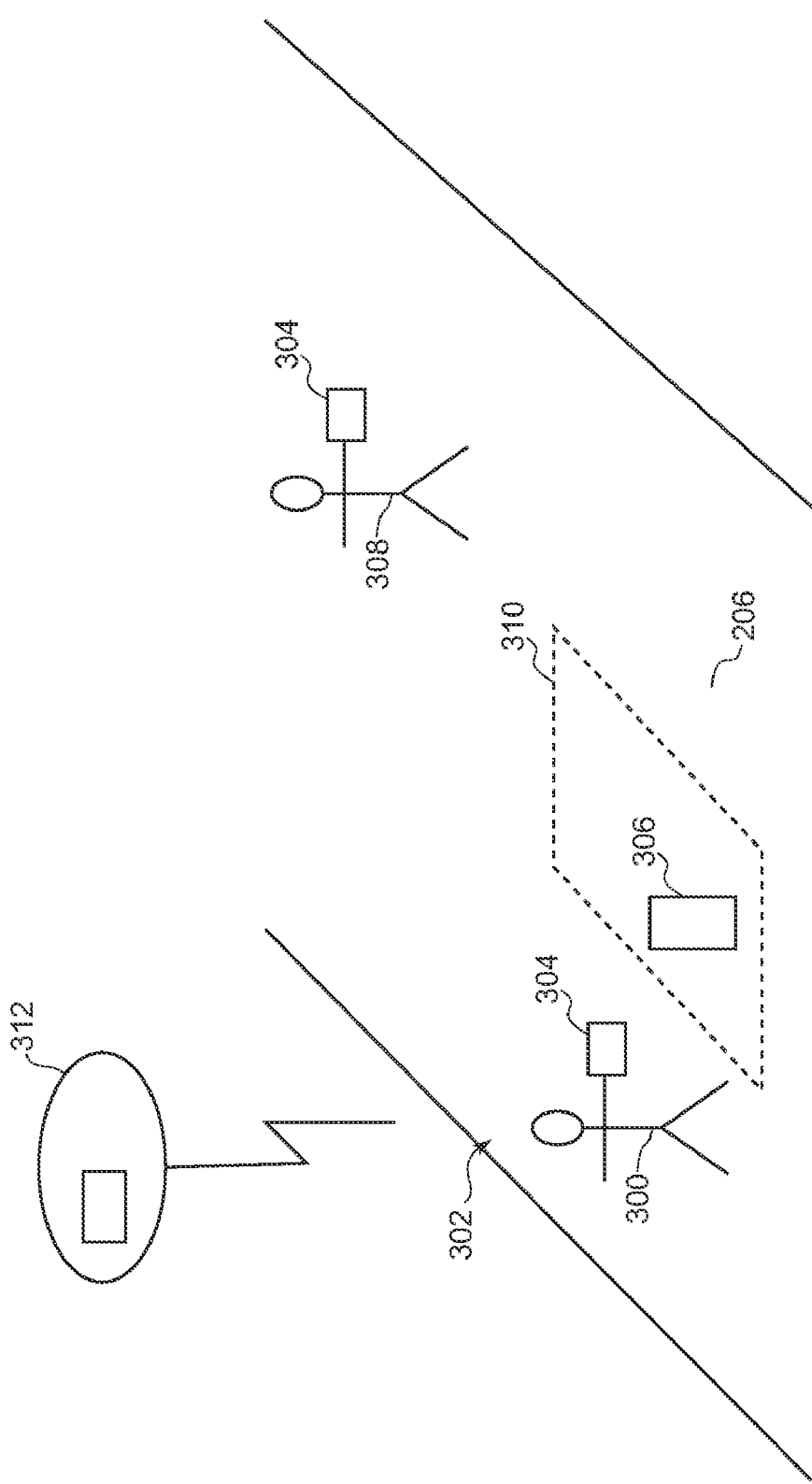
FIG. 15 shows an example of a scenario illustrating the working of another embodiment of the present invention.

Turning now to FIG. 15, in another scenario, a person 300 walks around a park 302. The person 300 is carrying a combined authoring and rendering tool 304. At a particular landmark 306, the person 300 decides to leave a voice tag to effect the playing of a voice message associated with the landmark 306 to another person 308, who in turn also carries a combined authoring and rendering tool 304. The relevant sonic landscape scene data created by person 300 is communicated to a server 312 via wireless communication.

The authoring and rendering tools 304 comprise a speaker, through which the voice tag created for the particular landmark 306 by person 300 can be displayed to the person 308. When the person 308 (or any other person carrying a suitable authoring and rendering tool 304) enters a created triggering zone 310 around the landmark 306, the authoring and rendering tool 304 will retrieve the stored sonic landscape scene data from the server 312, and the voice tag is then displayed to the person 308 through the speaker of the authoring and rendering tool 304. Each of the authoring and rendering tools 304 incorporates a GPS unit to facilitate obtaining and processing of the relevant positioning data.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

For example, it will be appreciated that whilst in the preferred embodiment an authoring tool and rendering tool for creation of an audio landscape has been described, the present invention is not limited to an audio landscape. Rather, the present invention readily extends to the creation of a visual landscape, ie to the assigning of geo-spatial position to eg image data for presentation to an exposee. Furthermore, the present invention extends to creating any presentation susceptible to being sensed by an exposee, including eg to smells, to temperature, to humidity, to wind, to pressure, and to light.

In the claims that follow and in the summary of the invention, except where the context requires otherwise due to express language or necessary implication, the word "comprising" is used in the sense of "including", ie the features specified may be associated with further features in various embodiments of the invention.

The invention claimed is:

1. An authoring system for creating data for playback through a renderer, including assigning a geo-spatial position to one or more virtual sensory-effects represented by virtual sensory-effect data, the virtual sensory-effect data including at least one sound represented by sound data, the authoring system comprising:

an author interface to display to an author a representation of a real geo-space, a representation of an exposee in the real geo-space, and a representation of one or more virtual sensory-effects to be rendered by the renderer, including at least one sound, the author interface further for providing for the author a mechanism to interactively manipulate the locations in the real geo-space of the exposee and of the sensory-effects;

a trigger creator coupled to the author interface and arranged in operation to accept a trigger description of how one or more events associated with the trigger are generated as a result of the exposee approaching, moving away, or both approaching and moving away from a region in the geo-space, the trigger creator creating in operation a trigger to trigger one or more the events; and a position assignor coupled to the author interface and arranged in operation to accept and assign positions for the sounds and further to accept and assign positions for the triggers, and further to assign relationships between triggers and one or more of the sensory effects, including at least one of the sounds, according to input provided by the author using the author interface;

data creator arranged in operation to create data for playback through the renderer based on any of the sounds, created triggers, assigned positions, and relationships therebetween, wherein the renderer is wearable by, carried by, or otherwise movable with the exposee, and arranged to accept the data created by the data creator and information related to the location of an exposee within the geo-space, and to present to the exposee the sensory effects of the created data in a manner such that the exposee is provided with the illusion of the sounds coming from the assigned locations and triggered according to the triggers.

2. An authoring system as claimed in claim 1, wherein, in addition to the sound data, the virtual sensory-effect data further includes at least one of the group consisting of virtual image data, virtual smell data, virtual temperature data, virtual humidity data, virtual wind data, virtual pressure data and virtual light data.

3. An authoring system as claimed in claim 1, wherein the data for playback comprises computer readable code for, in use, instructing the renderer to control presentation of the virtual sensory-effect data consisting of at least one of the group of virtual sound, virtual image, virtual smell, virtual humidity, virtual wind, virtual pressure, or virtual light data.

4. An authoring system as claimed in claim 1, wherein the author interface is arranged in a manner such as to enable the author to assign the location to one or more objects by placing and manipulating markers on the interface, the markers representing the objects, the objects including one or more of the triggers, an object defining movement along a trajectory, an object defining the real-time-determined-position of the exposee, an object defining the real-time-determined orientation, and the virtual sensory effects including the one or more sounds.

5. An authoring system as claimed in claim 4, wherein the authoring system comprises means for defining relationships between markers.

6. An authoring system as claimed in claim 4, wherein the author interface is arranged in a manner such as to enable the author to define relationships between the objects represented by markers.

7. An authoring system as claimed in claim 5, wherein the relationship comprises one or more of defining an object as a parent of another object, and defining an object as a child of another object, such that respective child objects inherit a functionality of their respective parent.

8. An authoring system as claimed in claim 7, wherein assigning triggers to one or more of the sensory effects includes defining a parent-child relationship.

9. An authoring system as claimed in claim 7, wherein assigning triggers to one or more of the sensory effects includes defining a parent-child relationship.

10. An authoring system as claimed in claim 8, wherein the object defining movement along a trajectory is arranged in a manner such that, during rendering, upon being triggered by an associated trigger, a source of data for presentation to the exposee is moved during rendering along a predetermined path.

11. An authoring system as claimed in claim 8, wherein the object defining movement along a trajectory may be arranged, by defining a relationship between the exposee and the object defining movement, in a manner such that, upon being triggered by the associated trigger, a source of data for presentation to the exposee is attached to the exposee, such that during rendering, the movement of the source follows that of the exposee.

12. An authoring system as claimed in claim 8, wherein the object defining movement along a trajectory is arranged in a manner such that it provides its own triggering functionality.

13. An authoring system as claimed in claim 8, wherein the marker for the object defining the real-time-determined-position of the exposee is arranged in a manner such that, during playback in the renderer, its movement within the geo-space is dependant upon positioning data externally provided to the renderer.

14. An authoring system as claimed in claim 13, wherein the positioning data is provided to the renderer by way of a global positioning system (GPS) that is wearable by, carried by, or otherwise movable with the exposee.

15. An authoring system as claimed in claim 8, wherein the marker for the object defining the real-time-determined-orientation of the exposee is arranged in a manner such that, during playback in the renderer, its orientation within the geo-space is dependant upon orientation data externally provided to renderer.

16. An authoring system as claimed in claim 15, wherein the orientation data is provided, in use, by way of sensor means that is wearable by, carried by, or otherwise movable with the exposee.

17. An authoring system as claimed in claim 1, wherein the trigger is arranged in a manner such that, during playback, the one or more events associated with the trigger are triggered depending on the exposee marker entering or leaving a triggering zone around the location of the trigger.

18. An authoring system as claimed in claim 17, wherein the triggering zone is of a circular shape.

19. An authoring system as claimed in claim 17, wherein the triggering zone is of a user-defined shape.

20. An authoring system as claimed in claim 1, wherein the authoring system is arranged to transfer the created data to the renderer via a data carrier means comprising one or more of the group of a computer network, a portable data carrier, or a wireless data carrier for effecting the presentation of the sensory-effect data to the exposee.

21. An authoring system as claimed in claim 20, wherein the authoring system is arranged in a manner such that, in use, the effecting of the presentation by the renderer of the sensory-effect data to the exposee can be manipulated in real-time by the user.

22. An authoring system as claimed in claim 1, wherein the authoring system further comprises a rendering tool for effecting the presentation by the renderer of the sensory-effect data to the author to provide feedback of what would be presented to the exposee.

23. An authoring system as claimed in claim 1, further comprising trigger assigning means enabling the author to assign a trigger condition to said sensory-effect data, said trigger condition controlling the delivery of said sensory-effect data at said real location.

24. An authoring system as claimed in claim 1, wherein in the case of the virtual sound, the data from the renderer is presented to the exposee in binaural form.

25. An authoring system as claimed in claim 1, further comprising a sound creator coupled to the author interface and arranged in operation to accept for each sound, one or more sound behavior properties, and to produce a modified sound having the sound behavior properties.

26. An authoring system as claimed in claim 25, wherein the renderer includes a sound renderer arranged to present to the exposee the sounds in a manner such that the exposee is provided with the illusion of the sounds coming from the assigned locations and behaving according to the sound behavior properties and triggered according to the triggers.

27. An authoring system as claimed in claim 26, wherein the sound renderer includes a spatialization system that binauralizes audio signals to produce binauralized signals that are input to headphones worn by the exposee to provide the illusion to the exposee that the sounds are coming from the assigned locations.

28. An authoring tool comprising means for accepting data representing a virtual sensory effect, including a virtual sound effect, and means for creating a data stream which is a combination of data representing a location in a real geo-space and the accepted data representing the virtual sensory effect, including a virtual sound effect, the data stream being for a renderer wearable by, carried by, or otherwise movable with an exposee arranged to present rendered data to an exposee such that the exposee has the sensation that the virtual sound effect is located at the location of the real geo-space.

29. An authoring tool adapted to create a data stream useable by a presentation means, the presentation means being wearable by, carried by, or otherwise movable with an exposee and arranged to present a sensory effect to the exposee as the exposee moves through a real geo-space, the sensory effect including a sound effect, said data stream comprising a combination of data representing said real geo-space, and data representing the sensory effect, the sensory effect including a sound effect, the authoring tool adapted to interactively assign geo-spatial location to the sensory effect in said representation of said real geo-space, the data stream arranged such that the exposee presented the output of the presentation means has the sensation that the sound effect is located at the location to which the sound effect is assigned in the real geo-space.

30. An authoring system comprising means for accepting virtual sensory-effect data, including virtual audio data, and means for assigning a real geo-spatial position to the virtual sensory-effect data, to create data for a renderer that is wearable by, carried by, or otherwise movable with an exposee, and arranged to present information to the exposee such that an exposee has the sensation that the virtual audio of the virtual audio data is located at the real geo-spatial position.

31. A renderer arranged, in use, to effect presentation to an exposee of data created by an authoring tool for creating playback through a renderer, the authoring tool designed in operation to assign a geo-spatial position and one or more behaviors to one or more virtual sensory-effects represented by virtual sensory-effect data, the virtual sensory-effect data including at least one sound represented by sound data, wherein the authoring tool includes:
    an author interface to display to an author a representation of a real geo-space, a representation of an expose in the real geo-space, and a representation of one or more virtual sensory-effects created by the renderer, including at least one sound, the author interface further for providing for the author a mechanism to interactively manipulate the locations in the real geo-space of the exposee and of the sensory-effects;
    a trigger creator coupled to the author interface and arranged in operation to accept a trigger description of how one or more events associated with the trigger are generated as a result of the exposee approaching, moving away, or both approaching and moving away from a region in the geo-space, the trigger creator creating in operation a trigger to trigger one or more the events; and
    a position assignor coupled to the author interface and arranged in operation to accept and assign positions in the real geo-space for the sounds and further to accept and assign positions in the real geo-space for the triggers, and further to assign relationships between triggers and one or more of the sensory effects, including at least one of the sounds, according to input provided by the author using the author interface;
    data creator arranged in operation to create the data for the renderer based on any of the sounds, created triggers, assigned positions, and relationships therebetween,
the rendering tool comprising:
    a first input arranged in operation to accept information related to the location of an exposee within the geo-space;
    a second input arranged in operation to accept the data created by the authoring tool, and
    a rendering engine arranged in operation to present the accepted authoring tool-created data to the exposee in a manner such that the exposee is provided with the illusion of the sounds coming from the assigned locations and triggered according to the triggers,
wherein the renderer is wearable by, carried by, or otherwise movable with the exposee.

32. A method of enabling an author to assign a geo-spatial position to virtual sensory-effect data corresponding to one or more virtual sensory effects, including a sound effect, the method comprising the steps of:
    providing an author interface for displaying a representation of a real geo-space,
    providing sourcing means for sourcing virtual sensory-effect data, and
    providing assigning means for enabling an author using the author interface to assign said sensory effect data to a location within the representation corresponding to a real location within the geo-space at which it is desired the sensory effects to be perceived by an exposee in the geo-space, the assigning producing data for a means for rendering, the means for rendering being wearable by, carried by, or otherwise movable with the exposee, and including:
        means for accepting information related to the location of the exposee; and
        means for processing the data such that information is presented to the exposee in a manner such that the exposee is provided with the illusion of the virtual sensory-effects coming from the location to which the author assigned the virtual sensory effect data.

33. A method in an authoring system for creating data for playback through a renderer, the data representing one or more virtual sensory-effects represented by virtual sensory-effect data, including at least one sound represented by sound data, the method comprising:
    displaying to an author at an author interface a representation of a real geo-space, a representation of an exposee in the real geo-space, and a representation of one or more virtual sensory-effects to be rendered by the renderer, including at least one sound;
    accepting from the author at least one trigger, including a trigger description of how one or more events associated with the trigger are generated as a result of the exposee approaching, moving away, or both approaching and moving away from a region in the geo-space; and
    accepting from the author positions assigned by the author using the author interface, the positions including positions for the sounds and positions for the triggers;
    accepting from the author relationships between triggers and one or more of the sensory effects, including at least one of the sounds;

creating data for playback through the renderer based on any of the sounds, created triggers, assigned positions, and relationships therebetween,
wherein the renderer is wearable by, carried by, or otherwise movable with the exposee, and arranged to accept the created data and information related to the location of an exposee within the geo-space, and to present to the exposee the sensory effects of the created data in a manner such that the exposee is provided with the illusion of the sounds coming from the assigned locations and triggered according to the triggers.

34. A method as claimed in claim 33, wherein in the case of the virtual sound, the rendering by the renderer includes presenting data to the exposee in binaural form.

* * * * *